Oct. 28, 1969  HANS-JOACHIM TITUS  3,474,905
METHOD AND APPARATUS FOR DISCHARGING SOLID
MATERIAL FROM A CENTRIFUGE
Filed Sept. 5, 1967  7 Sheets-Sheet 1

INVENTOR
HANS-JOACHIM TITUS

BY  Arthur Schwartz

ATTORNEY

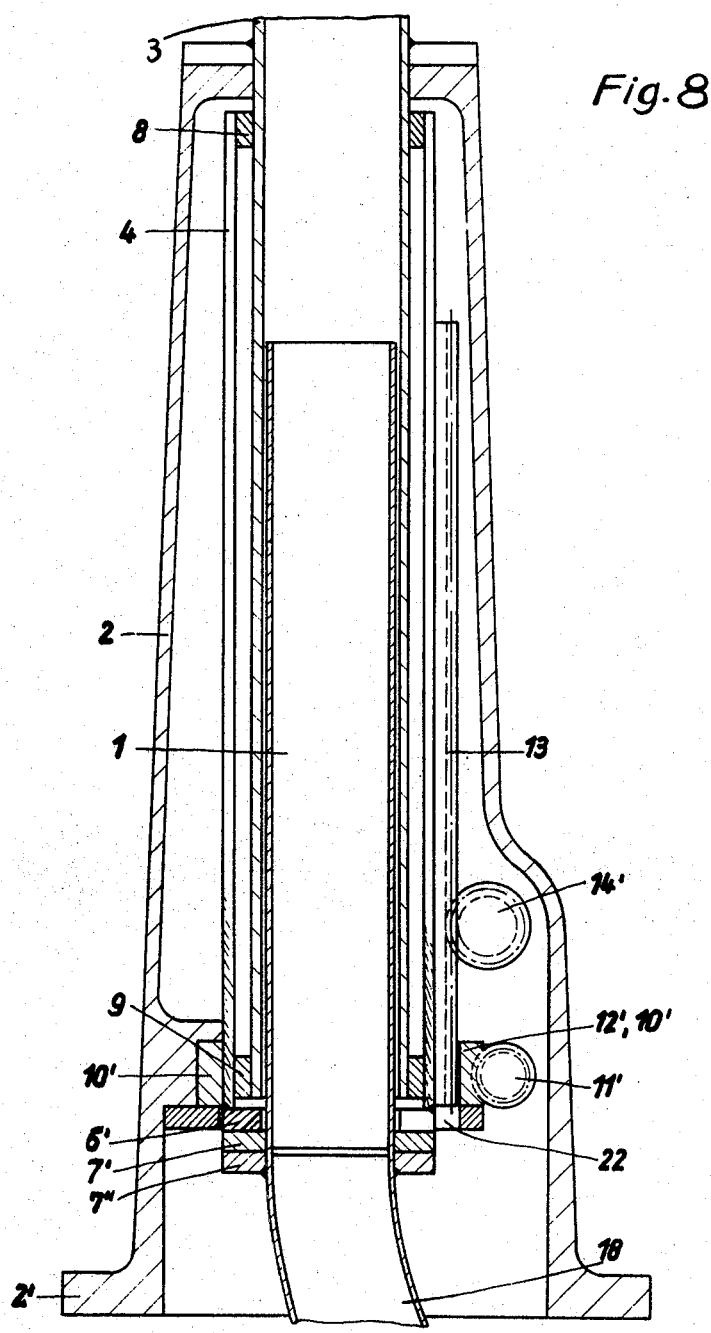

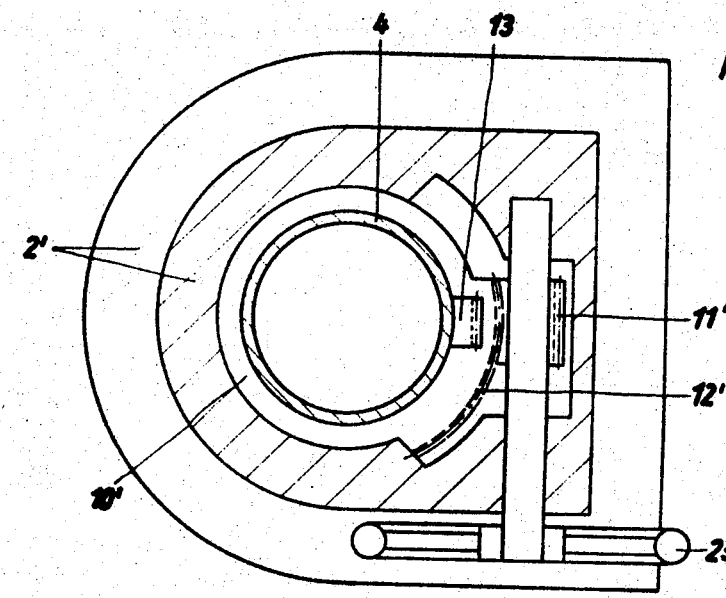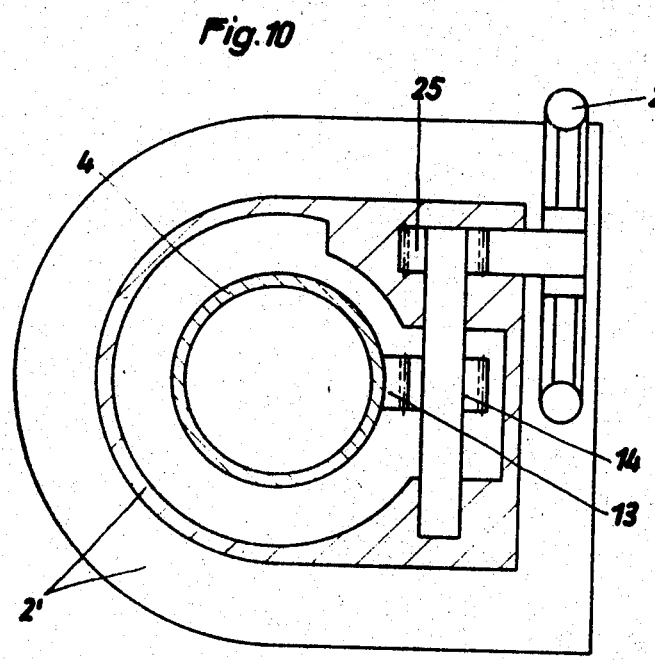

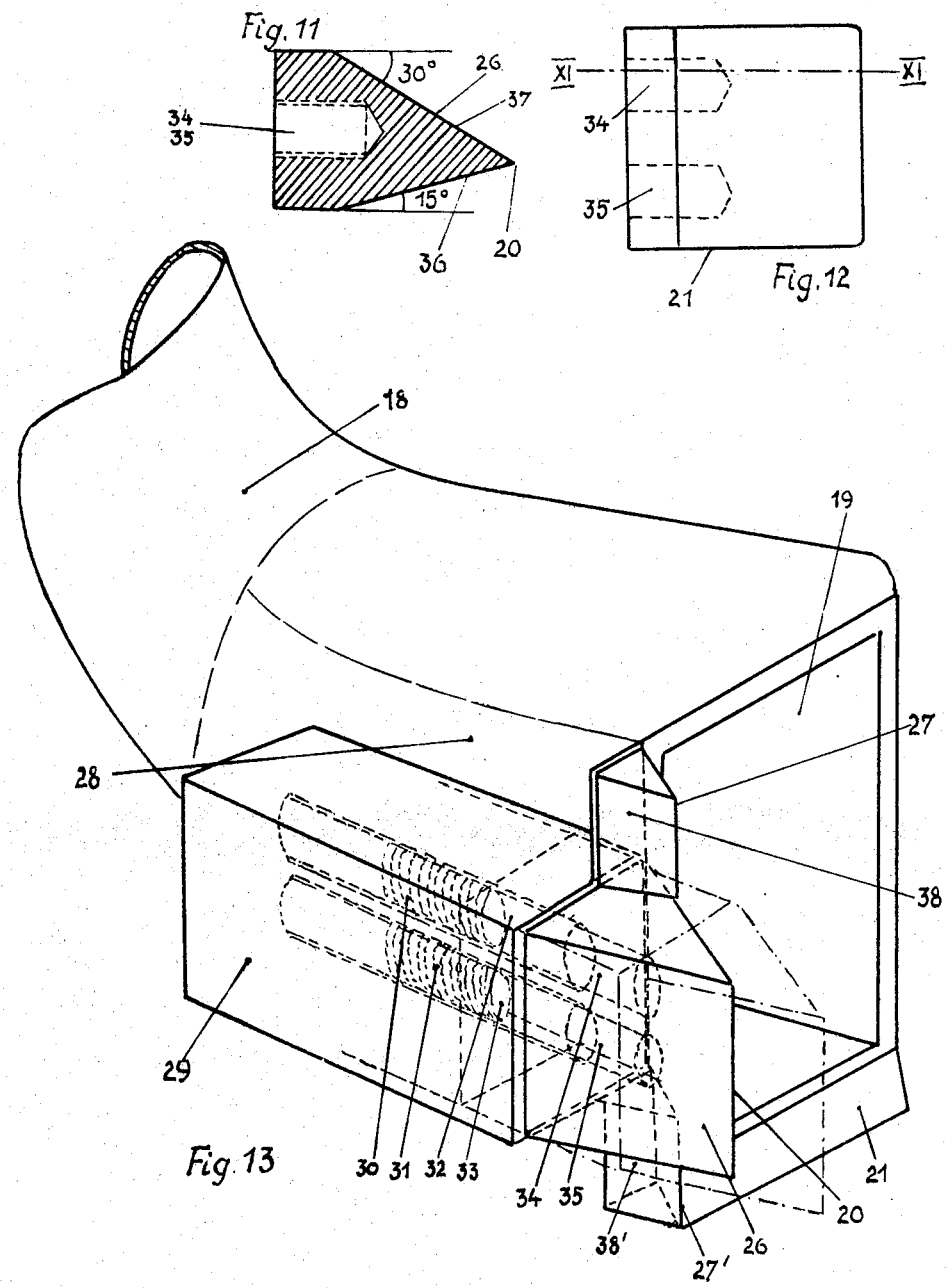

United States Patent Office 3,474,905
Patented Oct. 28, 1969

3,474,905
METHOD AND APPARATUS FOR DISCHARGING SOLID MATERIAL FROM A CENTRIFUGE
Hans-Joachim Titus, 2 Brunhildstrasse,
6148 Heppenheim, Bergstrasse, Germany
Filed Sept. 5, 1967, Ser. No. 665,493
Int. Cl. B04b *11/08*
U.S. Cl. 210—78                              9 Claims

ABSTRACT OF THE DISCLOSURE

A method and apparatus for cleaning a vertical centrifuge during operation by means of a blade which is moved horizontally and vertically along the walls of the centrifuge.

---

This invention relates to methods and apparatus for scraping and discharging solid material from vertical centrifuges during operation.

Vertical centrifuges are widely used as centrifuging devices, particularly in the chemical industry. Their disadvantage, in comparison with the substantially more expensive horizontal continuously-operated centrifuges is that after each centrifuging operation they have to be stopped and cleaned out by hand. If sterile material is being handled, an expensive sterile chamber is necessary in order to ensure sterility during the cleaning out operation. This involves a time-wasting, complicated and strenuous operation.

The object of the invention is to overcome the disadvantages outlined, and to scrape out the fully centrifuged material, without interrupting the rotation of the centrifuge, to remove it from the centrifuge at the same time, in a manner which renders sterilizing chambers or sterilizing locks superfluous.

Accordingly, the invention provides a method of scraping solid material from vertical centrifuges during operation, in which the substance scraped from the inner surface of the centrifuge is being discharged towards the top thereof by pneumatic means, the centrifuge being airtight.

According to the invention, this method is carried out in that, particularly in vertical centrifuges, a dip tube, which can be lowered into the centrifuge, is guided in a suction tube connected to the centrifuge, and forms part of a scraper and discharge device for removing the solid material, at the lower end of which dip tube there is provided an integral part of attachment which widens out in comparison with the tube and serves both as a suction nozzle and as a scraper knife and which, for the purpose of scraping out solid material, is first moved, by radial rotation of the dip tube, until its vertical scraping edge comes into the horizontal end position in front of the drum wall at the top of the drum. It is then displaced downwards in the vertical direction to scrape out solid material below it by means of the horizontal scraping edge, until the dip tube is again raised after the termination of the scraping operation. In this manner, it is possible to allow the centrifuge to rotate continuously at full speed without stopping, which was hitherto impossible with any vertical centrifuge.

The features of the invention and the construction of the individual parts of the new device will be described in more detail with reference to an example of an embodiment explained by the accompanying drawings, in which.

Figure 1:
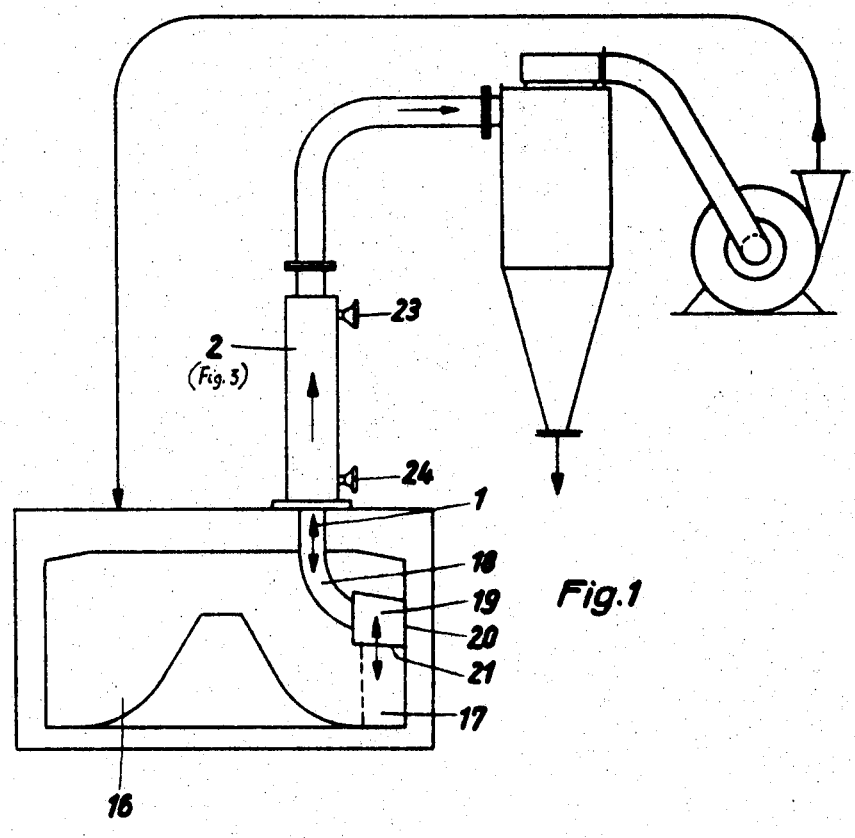
FIG. 1 shows diagrammatically the system of a pneumatic conveying plant together with a centrifuge.

FIGS. 6 to 10 correspond to FIGS. 1 to 5 and merely represent minor modifications in construction without deviating from the basic idea of the invention as a result. The reference numerals therein are provided with a prime insofar as they relate to modified parts which correspond to those in FIGS. 1 to 5.

FIGS. 11 to 13 show in about actual size the scraping blades attached to the nozzle, namely;

FIG. 11 shows a cross section of the actual knife corresponding to line X1 in FIG. 12;

FIG. 12 shows a side view of the knife taken from the front;

FIG. 13 illustrates in a prospective view the attachment of the blades to the anchoring block which is attached to the nozzle.

The fluid material to be supplied to the centrifuge enters the centrifugal perforated drum 16 by means of a filling pipe, not illustrated in FIG. 1. As a result of the centrifuging operation, solid material collects on the walls and the relatively solid mass 17 has to be scraped out and taken away. The dip tube 1, which is introduced into the centrifuge from above, serves primarily for this purpose according to the invention. It is held in a housing 2 which is closed in an air-tight manner, and comprises a scraper nozzle 19 which is somewhat larger in diameter at its curved lower end 18.

The dip tube 1 is not only rotatable about its axis but also adjustable in height. At the beginning of the scraping operation, during which the suction always takes place simultaneously, the bent end 18 of the tube is swung, by means of a device described below, into its end position in front of the drum wall, in order that the corresponding edge 20 of the nozzle can scrape the material off the drum wall. If the tube 1 is then lowered, the lower edge 21 of the nozzle then scrapes off the material 17 lying there in a substantially horizontal plane. The sequence of movements of the scraper nozzle described here are necessary for rational and safety reasons; rational because, in contrast to step-by-step scraping the sequence is executed in one operation. The safety lies in the fact that in the mid-position the nozzle cannot be turned onto the centrifuge cone. The nozzle cannot be turned towards the middle, that is to say onto the cone, in the bottom position either.

The scraping operation can take place when the centrifuge is rotating at full speed and, during this scraping operation, the substance scraped off is conveyed upwards out of the drum by the suction of a fan. After the lower position has been reached, the tube 1, with the suction nozzle, is moved back upwards again.

Figure 3:
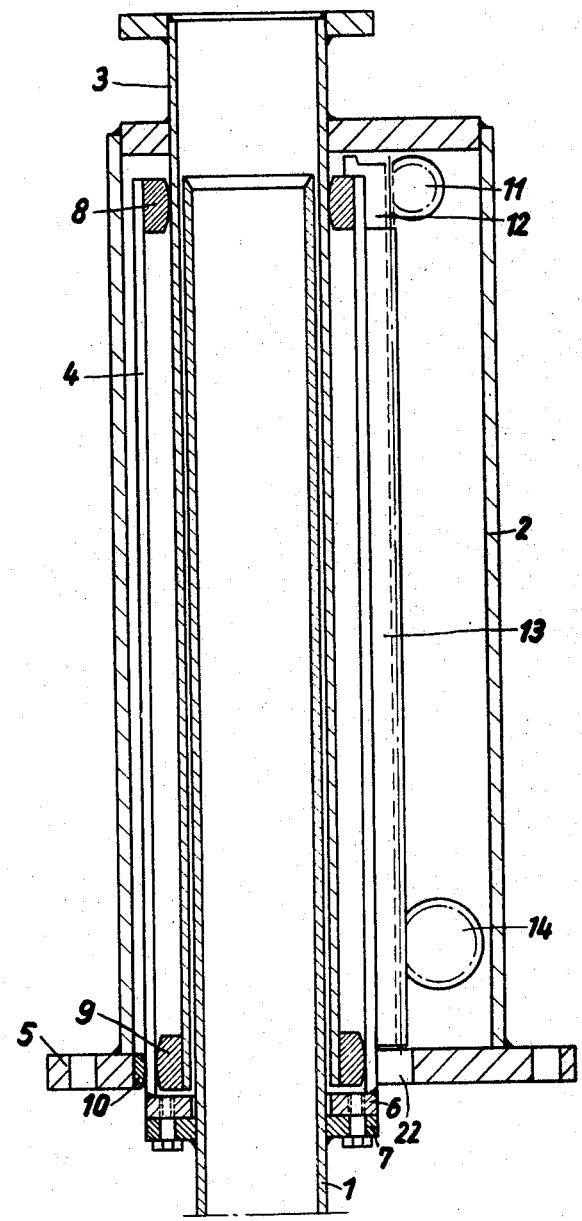
FIG. 3 illustrates the upper part of the dip tube with its mounting, on a larger scale in comparison with FIG. 1.
Figure 4:
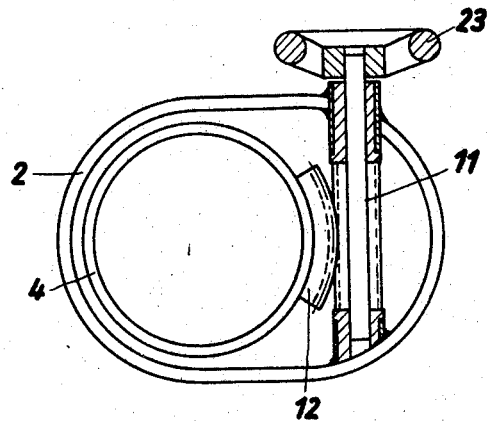
FIG. 4 shows the worm drive for the rotary movement.
Figure 5:
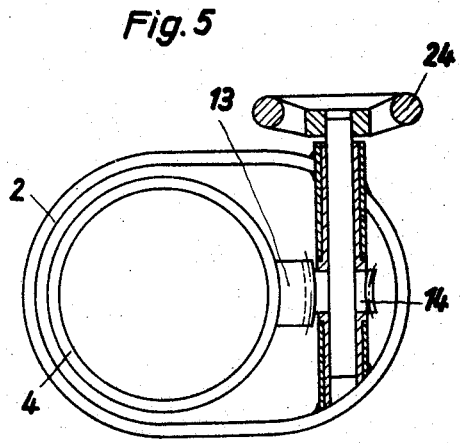
FIG. 5 shows the rack gearing for raising and lowering the dip tube.

The construction of the dip tube 1 can be seen in more detail from FIG. 3. The upper part of the tube 1 runs in a guide tube 3 which is welded into the air-tight housing 2. This is bolted to the cover of the centrifuge by means of the flange 5. On the dip tube 1 there is provided a flange 7 by means of which it is bolted to a corresponding flange 6 of a tube 4 surrounding the guide tube 3. Bronze seals 8 and 9 between the guide tube 3 and the tube 4, and seals 10 between the housing 2 and the tube 4 permit the relative movement of the tubes running one inside the other.

The rotation of the dip tube and of its mounting is rendered possible by the worm gear 11, 12 in the housing 2. The vertical adjustment is effected by the rack-and-pinion drive 13, 14. The shafts for the adjustment of the dip tube are taken through the housing wall where they carry the adjusting wheels 23 and 24 respectively. The rack 13 can pass downwards through a groove 22. The forces which arise during the scraping operation are transmitted to the housing primarily through the bush seals 8, 9 and 10 with this design; thus it is possible, for the first time, to allow the centrifuge to run continuously at full speed. With a peripheral speed of the centrifuge drum of about 40 metres per second with a diameter of 850 mm. for example, the material is centrifuged by its own kinetic energy into the suction nozzle where it is caught by the stream of air and conveyed away. A fan draws in the amount of air necessary for the pneumatic conveying and forces it back into the centrifuge after the separation of the conveyed material in a cyclone separator. As a result, extraction of dust from the pneumatic conveying air by means of a tube filter is saved because there is no exhaust air.

The air-tight construction of the scraper pneumatic system permits its use both for non-sterile and for sterile material. As a result of the closed cycle operation, the only amount of conveyor medium needed is the cubic capacity of all the parts of the plant which convey air. This circumstance is a particular advantage for expensive media.

Figure 6:
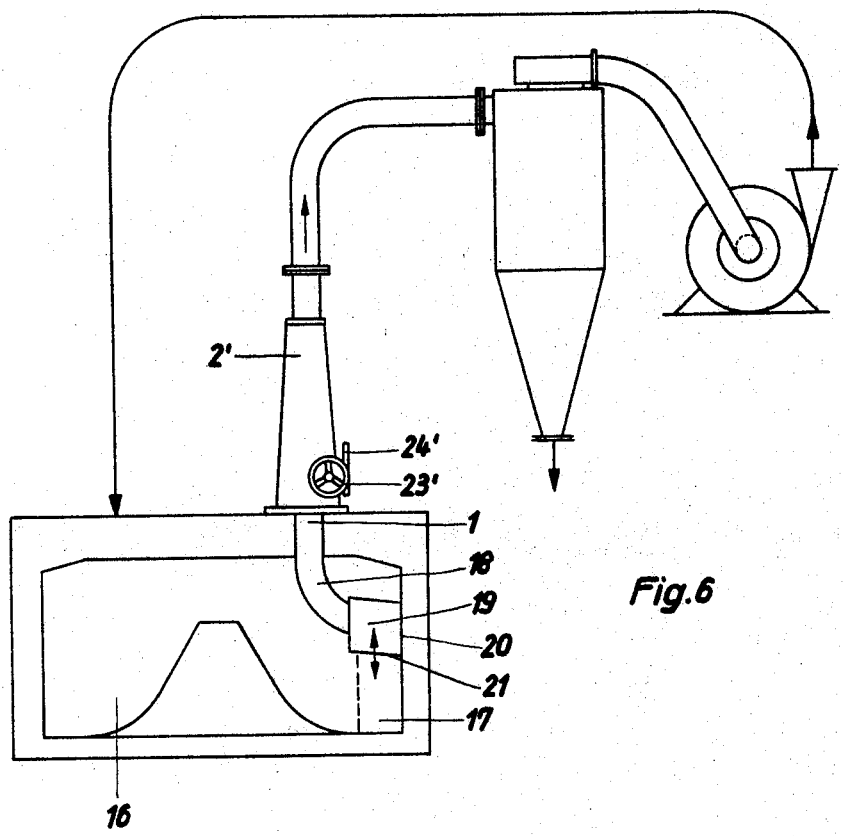

FIG. 6 shows a minor modification in comparison with that in FIG. 1. Here the cast housing 2' is not cylindrical but tapered and the two setting wheels 23' and 24' are at the lower part of said housing, which facilitates operation.

Figure 2:
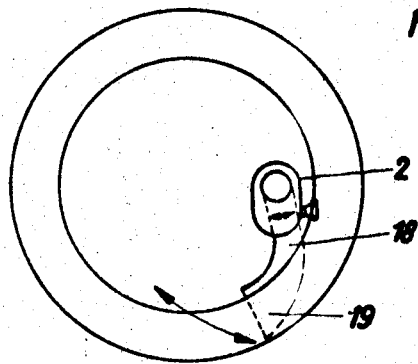
FIG. 2 is a diagrammatic cross section of the drum of the centrifuge of FIG. 1, with the dip tube and the suction nozzle.
Figure 7:
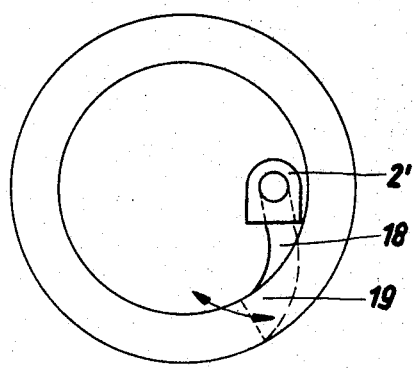

FIG. 7 corresponds substantially to FIG. 2. In FIG. 8, the radial drive 11', 12' is mounted below the rack-and-pinion drive 13, 14. The cast housing 2' makes it possible to dispense with the flange 5 shown in FIG. 3. The dip tube 1 can be separated from the lower end 18 as a result of which an additional flange 7" becomes necessary. The worm wheel 12' of the radial drive 11', 12' is simultaneously constructed in the form of a guide bush 10', as can clearly be seen from FIG. 9.

As a result of the accommodation of the radial drive in the lower part of the housing 2', the worm wheel 12' and the bronze bush 10' form a unit which is provided with a groove to guide the rack 13. The groove in the worm wheel 10', 12' only coincides with the groove 22 when the radial drive is terminated and the scraper nozzle has reached its end position in front of the drum wall. Only then can the vertical drive be actuated.

FIG. 9 illustrates the radial drive 11', 12', the worm wheel 12' simultaneously being constructed in the form of a guide bushing 10' with the groove for the rack 13.

In the arrangement shown in FIG. 10, a self-locking worm gear 25, which holds the dip tube 1 in every position and prevents recoils on the hand, is connected in front of the rack-and-pinion drive 13, 14.

In the FIGS. 11 through 13 is shown the scraper blade 26 attached to the scraper nozzle 19 and its attachment onto the end of the dip tube 18. On the one flat side 28 of the nozzle opening 19 an anchoring block 29 is fastened.

In channels of this block lie springs 30 and 31 as shown in FIG. 13. These springs push against moveable pins 32 and 33 in the channels. The pins are threadably attached to the scraper knife body and hold it secure. In operation, these springs constantly press the pins of the vertical scraper blade against the centrifuge wall so that the irregularities due to the residue film of the material is continually and completely scraped away. The forward position of the scraper blade 26 is shown in FIG. 13 by the dotted line.

The small blades 38 and 38' are not moveable. Their cutting edges 27 and 27' are held a slight distance away from the edge 20 for which the width of the mesh holding the clamping rings of the inner wall of the centrifuge take into account. The blade 26 alone serves to scrape off the residue film on the drum wall.

It is helpful if the flat side 36 and 37 of the scraper blade 26 are somewhat inclined tangentially to the centrifuge wall; namely, so that the side 36 adjoining the wall is at a smaller angle then the other side. In FIG. 11 the angle of one side face is 15° and the other 30° to the tangent of the centrifuge wall.

What I claim is:
1. A centrifugal separator device comprising:
  (a) an airtight enclosed centrifuge,
  (b) suction means,
  (c) a suction pipe connected to said suction means,
  (d) a dipping pipe connected to said suction pipe,
  (e) means for raising and lowering said dipping pipe axially with respect to said centrifuge,
  (f) means for pivoting said dipping pipe radially in said centrifuge,
  (g) a connecting piece connected to said dipping pipe and serving as a suction nozzle, and
  (h) a substantially vertical scraping means on said suction nozzle for scraping material from the wall of the centrifuge during lowering of the nozzle whereby the scraped material is conveyed out of the centrifuge by the suction nozzle.
2. A device as set forth in claim 1 further comprising:
  (a) a cylindrical pipe,
  (b) said dipping pipe surrounded concentrically by said cylindrical pipe,
  (c) said dipping pipe being telescopically movable in said cylindrical pipe.
3. A device as set forth in claim 2 further comprising:
  (a) an outer cylindrical pipe,
  (b) said outer pipe connected to said dipping pipe and movable therewith.
4. A device as set forth in claim 3 in which the connection between said dipping pipe and said outer pipe comprises a flange on the lever end of said outer pipe.
5. A device as set forth in claim 4 further comprising:
  (a) worm gear means to pivot said dipping pipe,
  (b) rack and pinion means for raising and lowering said dipping pipe,
  (c) said worm gear means and said rack and pinion means operably connected to drive said outer pipe.
6. A device as set forth in claim 1 wherein said scraping means comprises a pair of scraping blade members.
7. A device as defined in claim 6 wherein one of said blade members is resiliently biased outwardly.
8. A device as defined in claim 6 wherein one of said blade members is substantially rigidly supported.
9. A method of scraping solid material from a vertical centrifuge having a suction operated dipping tube with a scraping means connected thereto comprising:
  (a) moving said dipping tube and scraping means radially outward to contact the solid material at the top of said centrifuge,
  (b) moving said dipping tube and scraping means vertically downwards towards the bottom of said centrifuge,
  (c) scraping said solid material free as said dipping tube and scraping means move downwardly,
  (d) simultaneously pneumatically discharging said material upwardly out of said centrifuge through said dipping tube, and

(e) returning said dipping tube and scraping means to its initial position.

References Cited

UNITED STATES PATENTS

| | | | |
|---|---|---|---|
| 1,388,173 | 8/1921 | Daniels | 210—375 |
| 2,396,622 | 3/1946 | Tholl | 210—375 X |
| 2,485,465 | 10/1949 | Tholl | 210—375 |
| 2,614,134 | 10/1952 | Powers | 210—78 X |
| 3,275,142 | 9/1966 | Ekegren et al. | 210—376 X |

JAMES L. DeCESARE, Primary Examiner

U.S. Cl. X.R.

210—375, 376